(12) United States Patent
Kakimoto et al.

(10) Patent No.: US 12,286,172 B2
(45) Date of Patent: Apr. 29, 2025

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Yusuke Kakimoto, Okazaki (JP); Takashi Kodera, Okazaki (JP); Yoshio Kudo, Machida (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 366 days.

(21) Appl. No.: 17/473,570

(22) Filed: Sep. 13, 2021

(65) Prior Publication Data

US 2022/0081025 A1 Mar. 17, 2022

(30) Foreign Application Priority Data

Sep. 17, 2020 (JP) ................................. 2020-156286

(51) Int. Cl.
*B62D 5/04* (2006.01)
*B62D 6/02* (2006.01)

(52) U.S. Cl.
CPC ......... *B62D 5/0469* (2013.01); *B62D 5/0424* (2013.01); *B62D 6/02* (2013.01)

(58) Field of Classification Search
CPC ...... B62D 5/0469; B62D 5/0424; B62D 6/02; B62D 6/008; B62D 5/0457; B62D 6/001; B62D 5/046

(Continued)

(56) References Cited

U.S. PATENT DOCUMENTS

2007/0169984 A1* 7/2007 Ogawa .................. B62D 6/008
                                                                180/402
2017/0267276 A1* 9/2017 Kodera ................ B62D 5/0463
(Continued)

FOREIGN PATENT DOCUMENTS

EP          3569475 A1   11/2019
EP          3575186 A1   12/2019
(Continued)

OTHER PUBLICATIONS

Jan. 28, 2022 Extended European Search Report issued in Patent Application No. 21196622.1.

(Continued)

*Primary Examiner* — Scott A Reinbold
(74) *Attorney, Agent, or Firm* — Oliff PLC

(57) ABSTRACT

A steering control device includes an electronic control unit configured to calculate a target reaction torque that is a target value of a steering reaction force that is a force against steering input to a steering unit and to control operation of a steering-side motor provided in the steering unit such that a motor torque corresponding to the target reaction torque is generated. The electronic control unit is configured to calculate an angle axial force, as an axial component based on an axial force acting on a turning shaft that operates to turn turning wheels, the angle axial force being an axial force in which road-surface information is not reflected, and the angle axial force being determined according to an angle convertible to a turning angle of the turning wheels. The electronic control unit is configured to perform a guard process such that the angle axial force is not excessive.

4 Claims, 5 Drawing Sheets

(58) Field of Classification Search
USPC .......................................................... 180/402
See application file for complete search history.

(56) References Cited

U.S. PATENT DOCUMENTS

| | | | |
|---|---|---|---|
| 2017/0369095 A1* | 12/2017 | Kodera | ................ B62D 5/0421 |
| 2019/0233003 A1* | 8/2019 | Kodera | .................. B62D 6/008 |
| 2019/0367075 A1* | 12/2019 | Kodera | .................. B62D 5/003 |
| 2020/0130738 A1* | 4/2020 | Kodera | .................. B62D 6/008 |

FOREIGN PATENT DOCUMENTS

| | | |
|---|---|---|
| JP | 2005-096725 A | 4/2005 |
| JP | 2006-130940 A | 5/2006 |
| JP | 2013-177045 A | 9/2013 |
| JP | 2017-165219 A | 9/2017 |

OTHER PUBLICATIONS

Feb. 6, 2024 Office Action issued in Japanese Patent Application No. 2020-156286.

* cited by examiner

STEERING CONTROL DEVICE

CROSS-REFERENCE TO RELATED APPLICATION

This application claims priority to Japanese Patent Application No. 2020-156286 filed on Sep. 17, 2020, incorporated herein by reference in its entirety.

BACKGROUND

1. Technical Field

The disclosure relates to a steering control device.

2. Description of Related Art

In related art, a steer-by-wire steering system, in which a power transmission path between a steering unit that is steered by a driver and a turning unit that turns turning wheels according to the driver's steering is cut off, is known as a kind of steering system. In such a kind of steering system, road-surface information such as a road-surface reaction force applied to the turning wheels is not mechanically transmitted to a steering wheel. Therefore, a steering control device that controls such a kind of steering system transmits road-surface information to a driver by causing a steering-side actuator to apply, to the steering wheel, a steering reaction force determined in consideration of the road-surface information.

For example, Japanese Unexamined Patent Application Publication No. 2017-165219 (JP 2017-165219 A) discloses a steering control device that pays attention to an axial force acting on a turning shaft connected to turning wheels, and determines a steering reaction force based on a distributed axial force obtained by distributing an angle axial force calculated from a target turning angle acquired based on a steering angle of the steering wheel and a current axial force calculated from a drive current for a turning-side motor which is a drive source of a turning-side actuator, in predetermined distribution proportions. The angle axial force is calculated to increase as an absolute value of the target turning angle increases.

SUMMARY

When a vehicle is traveling, the vehicle may be in a situation in which a centrifugal force is greater than a frictional force between rear wheels and a road surface while the vehicle is being turned by a driver's steering of a steering wheel. This situation is likely to occur particularly on a low-friction road such as a frozen road. In this case, the vehicle is in an oversteering state in which the vehicle is turned more than the driver's steering of the steering wheel. In this oversteering state, the driver may perform so-called counter-steering for steering the steering wheel to a side opposite to the side to which the vehicle is turning such that a posture of the vehicle is restored.

Here, the angle axial force is based on a target turning angle which is acquired based on a steering angle of the steering wheel. Accordingly, while counter-steering is being performed, the angle axial force increases as the steering angle of the steering wheel increases and the steering reaction force may become excessive. As a result, in a situation in which counter-steering is being performed, a driver may feel heaviness during steering of the steering wheel and a feeling of steering may become worse.

The disclosure provides a steering control device that can prevent a feeling of steering from becoming worse in a situation in which counter-steering is being performed.

A steering control device according to an aspect of the disclosure is configured to control a steering system with a structure in which a power transmission path between a steering unit and a turning unit that turns turning wheels according to steering input to the steering unit is cut off. The steering control device includes an electronic control unit configured to calculate a target reaction torque that is a target value of a steering reaction force that is a force against the steering input to the steering unit and to control operation of a steering-side motor that is provided in the steering unit such that a motor torque corresponding to the target reaction torque is generated. The electronic control unit is configured to calculate an angle axial force, as an axial component based on an axial force acting on a turning shaft that operates to turn the turning wheels, the angle axial force being an axial force in which road-surface information is not reflected, and the angle axial force being determined according to an angle convertible to a turning angle of the turning wheels. The electronic control unit is configured to perform a guard process such that the angle axial force is not excessive.

With this configuration, in calculating the axial component, the guard process is performed such that the angle axial force is not excessive. Accordingly, even in a situation in which counter-steering is being performed, it is possible to restrain the steering reaction force from being excessive. As a result, in a situation in which counter-steering is being performed, a driver is less likely to feel heaviness during steering of the steering wheel (i.e., during operation of the steering wheel) and it is possible to prevent a feeling of steering from becoming worse.

The electronic control unit may be configured to limit an absolute value of the angle axial force such that the absolute value of the angle axial force is equal to or less than a limit value at which the angle axial force is not excessive. With this configuration, it is possible to appropriately limit the angle axial force to a desired limit value.

In the steering control device, the electronic control unit may be configured to store an angle axial force adjustment map that is used to perform adjustment such that the angle axial force is not excessive. With this configuration, since adjustment can be performed using the angle axial force adjustment map such that the angle axial force is not excessive, it is possible to simplify a configuration associated with the guard process.

In the steering control device, the limit value may be adjusted based on a vehicle speed. For example, when a vehicle is traveling at a high speed, an axial force acting on a turning shaft increases and thus the angle axial force may be set to increase in consideration of a road-surface reaction force. The same applies to a situation in which counter-steering is being performed. In this regard, with this configuration, since the limit value is adjusted based on the vehicle speed, it is possible to apply an appropriate steering reaction force while restricting the steering reaction force from being excessive in a situation in which counter-steering is being performed.

With the steering control device according to the aspect of the disclosure, it is possible to prevent a feeling of steering from becoming worse in a situation in which counter-steering is being performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
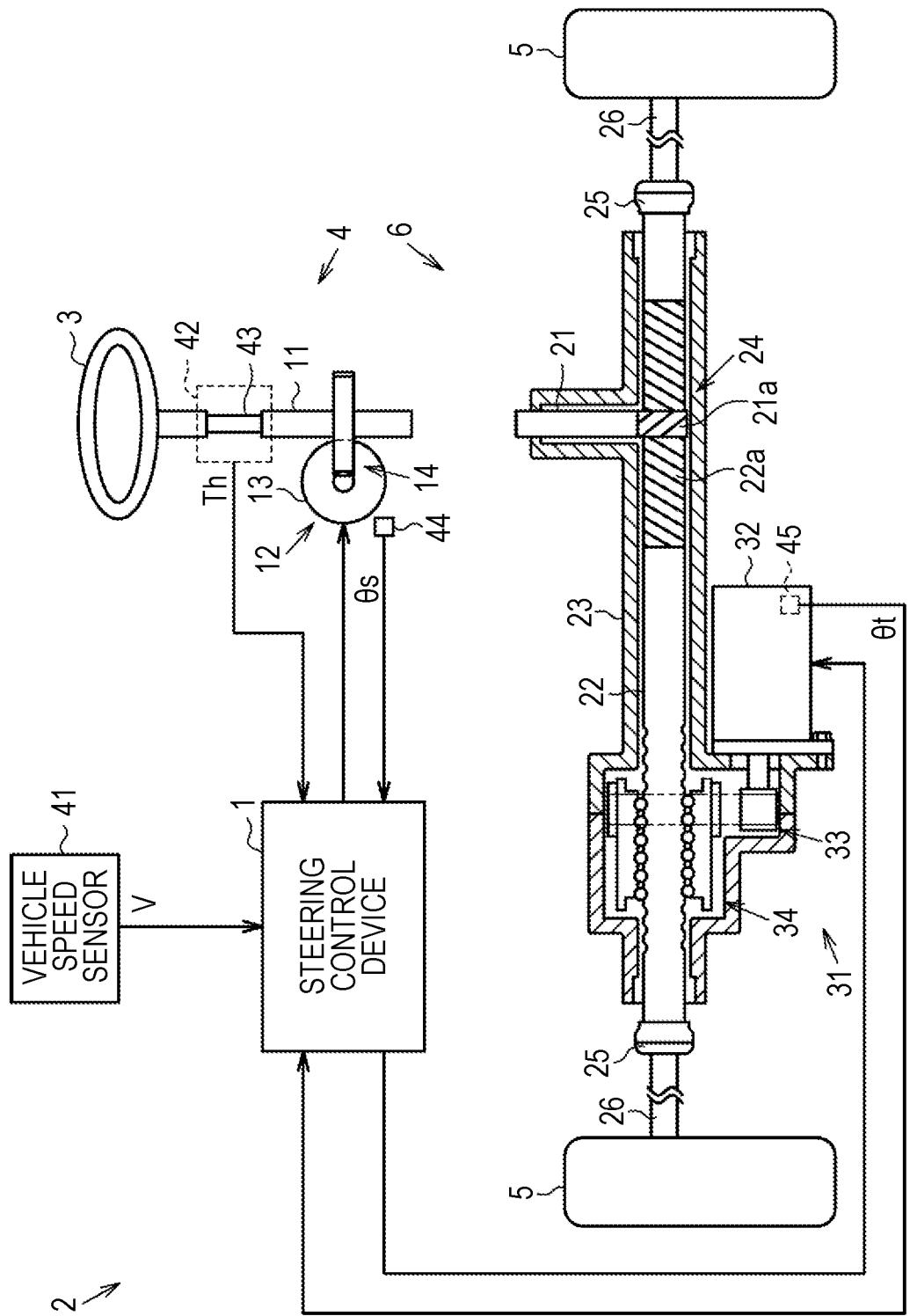
FIG. 1 is a diagram schematically illustrating a configuration of a steering system.

A steering control device according to an embodiment of the disclosure will be described below with reference to the accompanying drawings. As illustrated in FIG. 1, a steering system 2 which is controlled by the steering control device 1 according to the embodiment is configured as a steer-by-wire steering system. The steering system 2 includes a steering unit 4 that is steered by a driver via a steering wheel 3 and a turning unit 6 that turns turning wheels 5 according to the driver's steering of the steering unit 4.

The steering unit 4 includes a steering shaft 11 to which the steering wheel 3 is fixed and a steering-side actuator 12 that can apply a steering reaction force to the steering shaft 11. The steering-side actuator 12 includes a steering-side motor 13 that serves as a drive source and a steering-side speed reducer 14 that reduces rotation of the steering-side motor 13 and transmits the reduced rotation to the steering shaft 11. For example, a three-phase brushless motor may be employed as the steering-side motor 13 according to this embodiment.

The turning unit 6 includes a pinion shaft 21, a rack shaft 22 serving as a turning shaft that is connected to the pinion shaft 21, a rack housing 23 that accommodates the rack shaft 22 such that the rack shaft 22 can reciprocate, and a rack and pinion mechanism 24 that includes the pinion shaft 21 and the rack shaft 22. The pinion shaft 21 and the rack shaft 22 are arranged to have a predetermined crossing angle. Pinion teeth 21a formed in the pinion shaft 21 and rack teeth 22a formed in the rack shaft 22 engage with each other to constitute the rack and pinion mechanism 24. Tie rods 26 are respectively connected to both ends of the rack shaft 22 via rack ends 25 each of which is formed of a ball joint. The distal ends of the tie rods 26 are connected to knuckles (not illustrated) to which the right and left turning wheels 5 are assembled.

A reason for providing the pinion shaft 21 is that the rack shaft 22 is supported in a housing which is not illustrated. That is, the rack shaft 22 is supported to be movable in an axial direction thereof and is pressed to the pinion shaft 21 by a support mechanism (not illustrated) that is provided in the steering system 2. Accordingly, the rack shaft 22 is supported in the housing. Here, another support mechanism that supports the rack shaft 22 in the housing without using the pinion shaft 21 may be provided.

The turning unit 6 includes a turning-side actuator 31 that applies a turning force for turning the turning wheels 5 to the rack shaft 22. The turning-side actuator 31 includes a turning-side motor 32 that serves as a drive source, a transmission mechanism 33, and a conversion mechanism 34. The turning-side actuator 31 applies a turning force to the turning unit 6 by transmitting rotation of the turning-side motor 32 to the conversion mechanism 34 via the transmission mechanism 33 and causing the conversion mechanism 34 to convert the rotation to a reciprocating motion of the rack shaft 22. In this embodiment, for example, a three-phase brushless motor is employed as the turning-side motor 32, for example, a belt mechanism is employed as the transmission mechanism 33, and, for example, a ball screw mechanism is employed as the conversion mechanism 34.

In the steering system 2 having the aforementioned configuration, the turning angle of the turning wheels 5 is changed by applying the turning force from the turning-side actuator 31 to the rack shaft 22 according to a driver's steering operation. At this time, a steering reaction force against the driver's steering is applied to the steering wheel 3 from the steering-side actuator 12.

An electrical configuration according to this embodiment will be described below. The steering control device 1 is connected to the steering-side motor 13 and the turning-side motor 32 and controls operations thereof. The steering control device 1 includes a central processing unit (CPU) and a memory which are not illustrated and the CPU executes a program stored in the memory at intervals according to a predetermined operation cycle. Accordingly, various kinds of control are performed. That is, the steering control device 1 includes an electronic control unit (ECU) including the CPU and the memory.

A vehicle speed sensor 41 that detects a vehicle speed V which is a traveling speed of the vehicle and a torque sensor 42 that detects a steering torque Th applied to the steering shaft 11 are connected to the steering control device 1. The torque sensor 42 is provided on the steering shaft 11 at a position closer to the steering wheel 3 than a connection part connected to the steering-side speed reducer 14. The torque sensor 42 detects the steering torque Th based on a torsion of a torsion bar 43. A steering-side rotation angle sensor 44 detects a rotation angle θs of the steering-side motor 13 that is a relative angle in a range of 360° (360 degrees), as a detection value indicating an amount of steering of the steering unit 4. A turning-side rotation angle sensor 45 detects a rotation angle θt of the turning-side motor 32 that is a relative angle, as a detection value indicating an amount of turning of the turning unit 6. The steering-side rotation angle sensor 44 and the turning-side rotation angle sensor 45 are connected to the steering control device 1. For example, the steering torque Th and the rotation angles θs and θt are detected as being a positive value when the steering wheel is steered rightwards and as being a negative value when the steering wheel is steered leftwards. The steering control device 1 controls operations of the steering-side motor 13 and the turning-side motor 32 based on the various state quantities.

Figure 2:
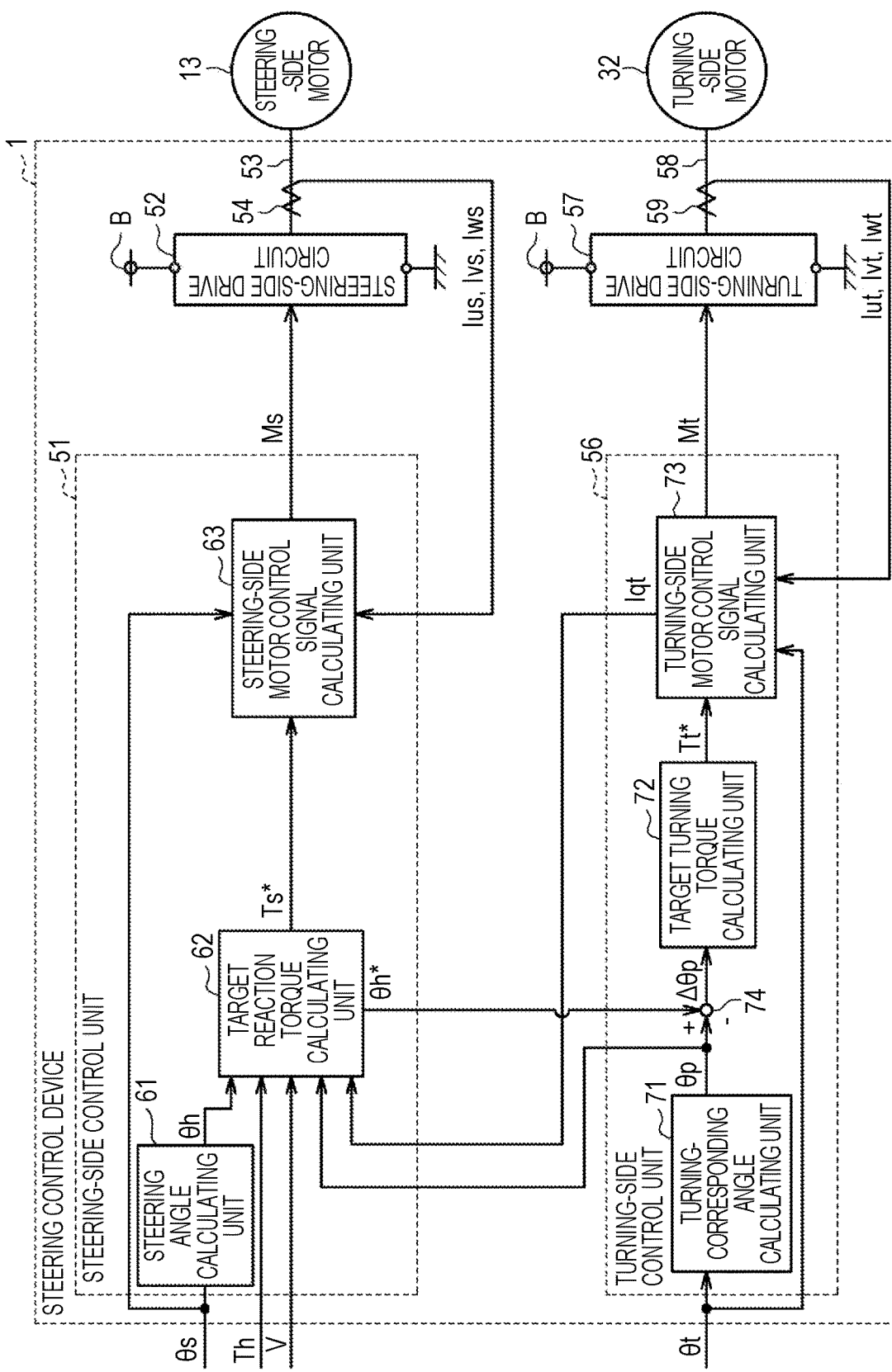
FIG. 2 is a block diagram illustrating a steering control device.

The configuration of the steering control device 1 will be described below. As illustrated in FIG. 2, the steering control device 1 includes a steering-side control unit 51 that outputs a steering-side motor control signal Ms and a steering-side drive circuit 52 that supplies drive electric power to the steering-side motor 13 based on the steering-side motor control signal Ms. Current sensors 54 detect phase current values Ius, Ivs, and Iws of phase currents for the steering-side motor 13 which flow in connection lines 53 between the steering-side drive circuit 52 and phase motor coils of the steering-side motor 13. The current sensors 54 are connected to the steering-side control unit 51. In FIG. 2, for the purpose of convenience of description, the connection lines 53 for phases and the current sensors 54 for phases are collectively illustrated as being single.

The steering control device 1 includes a turning-side control unit 56 that outputs a turning-side motor control signal Mt and a turning-side drive circuit 57 that supplies drive electric power to the turning-side motor 32 based on the turning-side motor control signal Mt. Current sensors 59 detect phase current values Iut, Ivt, and Iwt of phase currents for the turning-side motor 32 which flow in phase connection lines 58 between the turning-side drive circuit 57 and phase motor coils of the turning-side motor 32. The current sensors 59 are connected to the turning-side control unit 56. In FIG. 2, for the purpose of convenience of description, the connection lines 58 for phases and the current sensors 59 for phases are collectively illustrated as being single. For example, a known PWM inverter including a plurality of switching elements such as FETs is employed in each of the steering-side drive circuit 52 and the turning-side drive circuit 57 according to this embodiment. The steering-side motor control signal Ms and the turning-side motor control signal Mt are gate-on/off signals for prescribing ON/OFF states of the switching elements.

The steering-side control unit 51 and the turning-side control unit 56 supply drive electric power from an onboard power source B to the steering-side motor 13 and the turning-side motor 32 by outputting the steering-side motor control signal Ms and the turning-side motor control signal Mt to the steering-side drive circuit 52 and the turning-side drive circuit 57. Accordingly, the steering-side control unit 51 and the turning-side control unit 56 control the operations of the steering-side motor 13 and the turning-side motor 32.

The configuration of the steering-side control unit 51 will be described below. The steering-side control unit 51 generates the steering-side motor control signal Ms by performing operation processes indicated by the following control blocks at intervals according to a predetermined operation cycle. The vehicle speed V, the steering torque Th, the rotation angle θs, the phase current values Ius, Ivs, and Iws, a q-axis current value Iqt which is a drive current for the turning-side motor 32, and a turning-corresponding angle θp which will be described later are input to the steering-side control unit 51. Then, the steering-side control unit 51 generates the steering-side motor control signal Ms based on these state quantities and outputs the generated steering-side motor control signal Ms.

Specifically, the steering-side control unit 51 includes a steering angle calculating unit 61 that calculates a steering angle θh of the steering wheel 3, a target reaction torque calculating unit 62 that calculates a target reaction torque Ts* which is a target value of a steering reaction force, and a steering-side motor control signal calculating unit 63 that outputs the steering-side motor control signal Ms.

The rotation angle θs of the steering-side motor 13 is input to the steering angle calculating unit 61. The steering angle calculating unit 61 converts the rotation angle θs to a total angle including a range exceeding 360°, for example, by counting the number of rotations of the steering-side motor 13 from a neutral steering position, and acquires the total angle. The steering angle calculating unit 61 calculates the steering angle θh by multiplying the rotation angle which has been converted to the total angle by a conversion factor based on a rotation speed ratio of the steering-side speed reducer 14. The calculated steering angle θh is output to the target reaction torque calculating unit 62.

The vehicle speed V, the steering torque Th, the steering angle θh, the q-axis current value Iqt, and the turning-corresponding angle θp are input to the target reaction torque calculating unit 62. As will be described later, the target reaction torque calculating unit 62 calculates the target reaction torque Ts* based on the state quantities and outputs the calculated target reaction torque Ts* to the steering-side motor control signal calculating unit 63. The target reaction torque calculating unit 62 outputs the target steering angle θh* which is the target value of the steering angle θh of the steering wheel 3 acquired in the course of calculating the target reaction torque Ts*, to the turning-side control unit 56.

In addition to the target reaction torque Ts*, the rotation angle θs and the phase current values Ius, Ivs, and Iws are input to the steering-side motor control signal calculating unit 63. The steering-side motor control signal calculating unit 63 according to this embodiment calculates a d-axis target current value Ids* on a d axis and a q-axis target current value Iqs* on a q axis in a d/q coordinate system based on the target reaction torque Ts*. The d-axis target current value Ids* represents a target current value on the d axis in the d/q coordinate system. The q-axis target current value Iqs* represents a target current value on the q axis in the d/q coordinate system. The steering-side motor control signal calculating unit 63 calculates the q-axis target current value Iqs* such that the absolute value thereof increases as the absolute value of the target reaction torque Ts* increases. In this embodiment, the d-axis target current value Ids* is basically set to zero. The steering-side motor control signal calculating unit 63 generates the steering-side motor control signal Ms which is output to the steering-side drive circuit 52, by performing current feedback control in the d/q coordinate system.

Specifically, the steering-side motor control signal calculating unit 63 calculates the d-axis current value Ids and the q-axis current value Iqs which are actual current values for the steering-side motor 13 in the d/q coordinate system by mapping the phase current values Ius, Ivs, and Iws onto the d/q coordinates based on the rotation angle θs. The steering-side motor control signal calculating unit 63 calculates a target voltage value based on current differences on the d axis and the q axis such that the d-axis current value Ids follows the d-axis target current value Ids* and the q-axis current value Iqs follows the q-axis target current value Iqs*, and calculates the steering-side motor control signal Ms having a duty ratio (duty cycle) based on the target voltage value.

The calculated steering-side motor control signal Ms is output to the steering-side drive circuit 52. Accordingly, drive electric power corresponding to the steering-side motor control signal Ms is supplied from the steering-side drive circuit 52 to the steering-side motor 13. The steering-side motor 13 applies a steering reaction force indicated by the target reaction torque Ts* to the steering wheel 3.

The configuration of the turning-side control unit 56 will be described below. The turning-side control unit 56 generates the turning-side motor control signal Mt by performing operation processes indicated by the following control blocks at intervals according to a predetermined operation cycle. The rotation angle θt, the target steering angle θh*, and the phase current values Iut, Ivt, and Iwt for the turning-side motor 32 are input to the turning-side control unit 56. Then, the turning-side control unit 56 generates the turning-side motor control signal Mt based on the state quantities and outputs the generated turning-side motor control signal Mt.

Specifically, the turning-side control unit 56 includes a turning-corresponding angle calculating unit 71 that calculates a turning-corresponding angle θp which is a rotation angle of the pinion shaft 21. The turning-side control unit 56 further includes a target turning torque calculating unit 72 that calculates a target turning torque Tt* which is a target value of the turning force, and a turning-side motor control signal calculating unit 73 that outputs the turning-side motor control signal Mt. In the steering system 2 according to this embodiment, a steering angle ratio which is a ratio between the steering angle θh and the turning-corresponding angle θp is set to a fixed ratio 1:1, and a target turning-corresponding angle which is a target value of the turning-corresponding angle θp is the same as the target steering angle θh*.

The rotation angle θt of the turning-side motor 32 is input to the turning-corresponding angle calculating unit 71. The turning-corresponding angle calculating unit 71 converts the input rotation angle θt to a total angle, for example, by counting the number of rotations of the turning-side motor 32 from a neutral position at which the vehicle moves straight ahead, and acquires the total angle. The turning-corresponding angle calculating unit 71 calculates the turning-corresponding angle θp by multiplying the rotation angle which has been converted to the total angle by a conversion factor based on a speed reduction ratio of the transmission mechanism 33, a lead of the conversion mechanism 34, and a rotation speed ratio of the rack and pinion mechanism 24. That is, the turning-corresponding angle θp corresponds to the steering angle θh of the steering wheel 3 when it is assumed that the pinion shaft 21 is connected to the steering shaft 11. The calculated turning-corresponding angle θp is output to a subtractor 74 and the target reaction torque calculating unit 62. In addition to the turning-corresponding angle θp, the target steering angle θh* is input to the subtractor 74.

An angle difference Δθp which is acquired from the subtractor 74 by subtracting the turning-corresponding angle θp from the target steering angle θh*, that is, the target turning-corresponding angle, is input to the target turning torque calculating unit 72. The target turning torque calculating unit 72 calculates a target turning torque Tt* which is a target value of a turning force applied by the turning-side motor 32, as a control value for causing the turning-corresponding angle θp to follow the target steering angle θh*, based on the angle difference Δθp. Specifically, the target turning torque calculating unit 72 calculates, as the target turning torque Tt*, a sum of output values of a proportional element, an integral element, and a differential element, with the angle difference Δθp being used as an input. That is, the target turning torque calculating unit 72 calculates the target turning torque Tt* based on performing of turning angle feedback control for causing an actual turning-corresponding angle θp to follow the target steering angle θh* which is a target turning-corresponding angle.

In addition to the target turning torque Tt*, the rotation angle θt and the phase current values Iut, Ivt, and Iwt are input to the turning-side motor control signal calculating unit 73. The turning-side motor control signal calculating unit 73 calculates the q-axis target current value Iqt* on the q axis in the d/q coordinate system based on the target turning torque Tt*. The turning-side motor control signal calculating unit 73 calculates the q-axis target current value Iqt* such that the absolute value thereof increases as the absolute value of the target turning torque Tt* increases. In this embodiment, the d-axis target current value Idt* on the d axis is basically set to zero. Similarly to the steering-side motor control signal calculating unit 63, the turning-side motor control signal calculating unit 73 generates the turning-side motor control signal Mt which is output to the turning-side drive circuit 57, by performing current feedback control in the d/q coordinate system. The q-axis current value Iqt which is calculated in the process of calculating the turning-side motor control signal Mt is output to the target reaction torque calculating unit 62.

The calculated turning-side motor control signal Mt is output to the turning-side drive circuit 57. Accordingly, drive electric power corresponding to the turning-side motor control signal Mt is supplied to the turning-side motor 32 from the turning-side drive circuit 57. Then, the turning-side motor 32 applies a turning force indicated by the target turning torque Tt* to the turning wheels 5.

Figure 3:
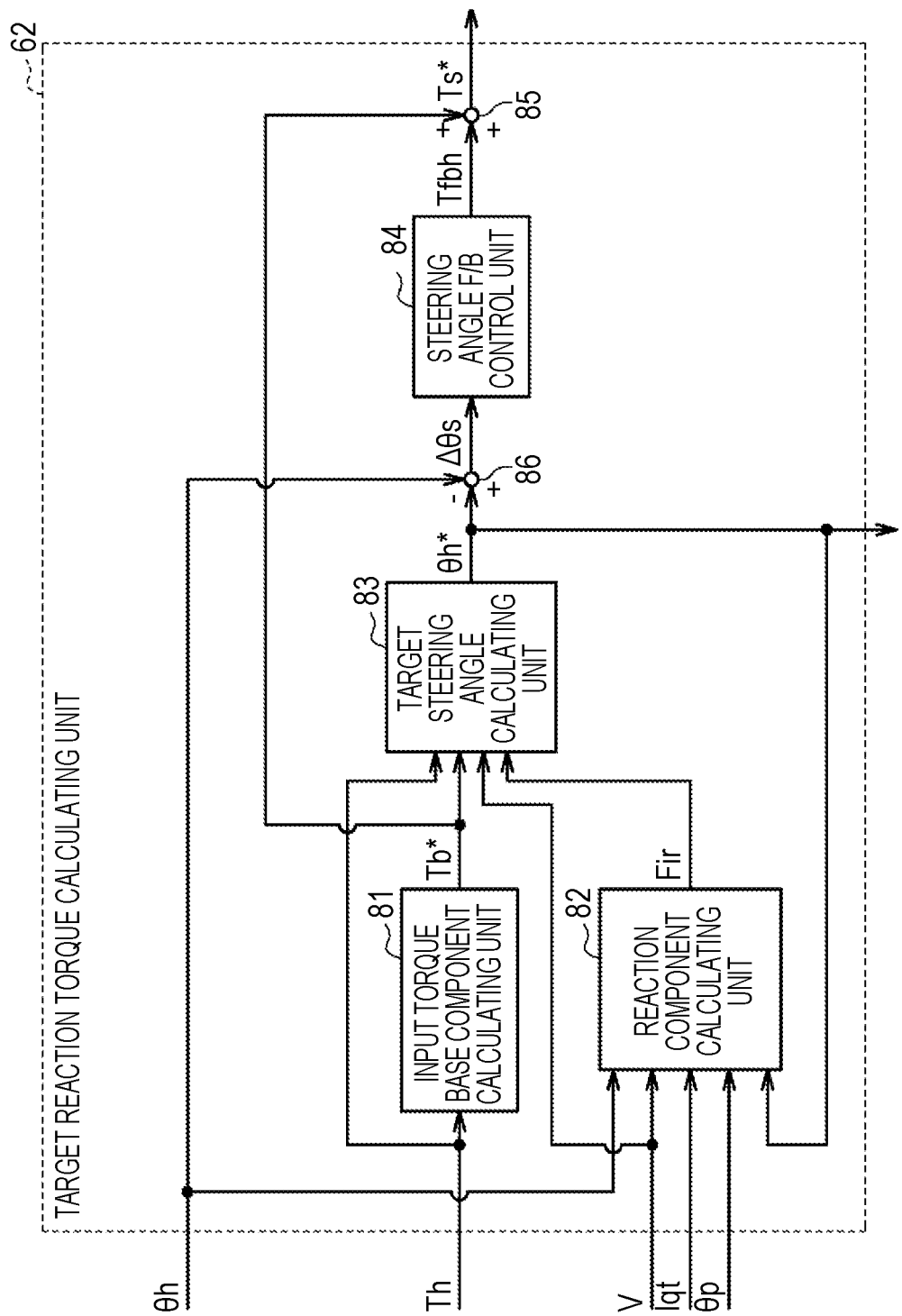
FIG. 3 is a block diagram illustrating a target reaction torque calculating unit.

The configuration of the target reaction torque calculating unit 62 will be described below. As illustrated in FIG. 3, the target reaction torque calculating unit 62 includes an input torque base component calculating unit 81 that calculates an input torque base component Tb* which is a force for rotating the steering wheel 3 in a driver's steering direction. The target reaction torque calculating unit 62 includes a reaction component calculating unit 82 that calculates a reaction component Fir which is a force resisting to the rotation of the steering wheel 3 based on a driver's steering. The target reaction torque calculating unit 62 includes a target steering angle calculating unit 83 that calculates the target steering angle θh* which is a target value of a steering angle θh, and a steering angle feedback control unit (hereinafter referred to as a "steering angle F/B control unit") 84 that calculates a steering angle feedback component (hereinafter referred to as a "steering angle F/B component") Tfbh by performing a steering angle feedback operation.

The steering torque Th is input to the input torque base component calculating unit 81. The input torque base component calculating unit 81 calculates the input torque base component Tb* such that the absolute value thereof increases as the absolute value of the steering torque Th increases. The calculated input torque base component Tb* is input to the target steering angle calculating unit 83 and an adder 85.

The vehicle speed V, the steering angle θh, the q-axis current value Iqt of the turning-side motor 32, the turning-corresponding angle θp, and the target steering angle θh* are input to the reaction component calculating unit 82. The reaction component calculating unit 82 calculates a reaction component Fir corresponding to an axial force acting on the rack shaft 22 as will be described later based on the state quantities, and outputs the calculated reaction component to the target steering angle calculating unit 83.

The vehicle speed V, the steering torque Th, the input torque base component Tb*, and the reaction component Fir are input to the target steering angle calculating unit 83. The target steering angle calculating unit 83 calculates the target steering angle θh* using a model expression for correlating the target steering angle θh* with an input torque Tin* which is a value obtained by adding the steering torque Th to the input torque base component Tb* and subtracting the reaction component Fir therefrom.

$$Tin^* = C \cdot \theta h^{*\prime} + J \cdot \theta h^{*\prime\prime} \quad (1)$$

This model expression defines and represents a relationship between a torque and a rotation angle of a rotation shaft rotating with rotation of the steering wheel 3 in a structure in which the steering wheel 3 and the turning wheels 5 are mechanically connected, that is, a structure in which the steering unit 4 and the turning unit 6 are mechanically connected. This model expression is expressed using a viscosity coefficient C obtained by modeling friction or the like of the steering system 2 and an inertia coefficient J obtained by modeling inertia of the steering system 2. The viscosity coefficient C and the inertia coefficient J are set to be variable according to the vehicle speed V. The target steering angle θh* calculated using the model expression is output to the reaction component calculating unit 82 in addition to a subtractor 86 and the turning-side control unit 56.

An angle difference Δθs acquired from the subtractor 86 by subtracting the steering angle θh from the target steering angle θh* is input to the steering angle F/B control unit 84. Then, the steering angle F/B control unit 84 calculates a steering angle F/B component Tfbh serving as a base of the steering reaction force which is applied by the steering-side motor 13, as a control value for controlling the steering angle θh to the target steering angle θh* through feedback, based on the angle difference Δθs. Specifically, the steering angle F/B control unit 84 calculates, as the base reaction torque, a sum of output values of a proportional element, an integral element, and a differential element, with the angle difference Δθs being used as an input. The calculated steering angle F/B component Tfbh is output to an adder 85.

The target reaction torque calculating unit 62 calculates, as the target reaction torque Ts*, a value obtained by adding the steering angle F/B component Tfbh to the input torque base component Tb* in the adder 85. The configuration of the reaction component calculating unit 82 will be described below.

Figure 4:
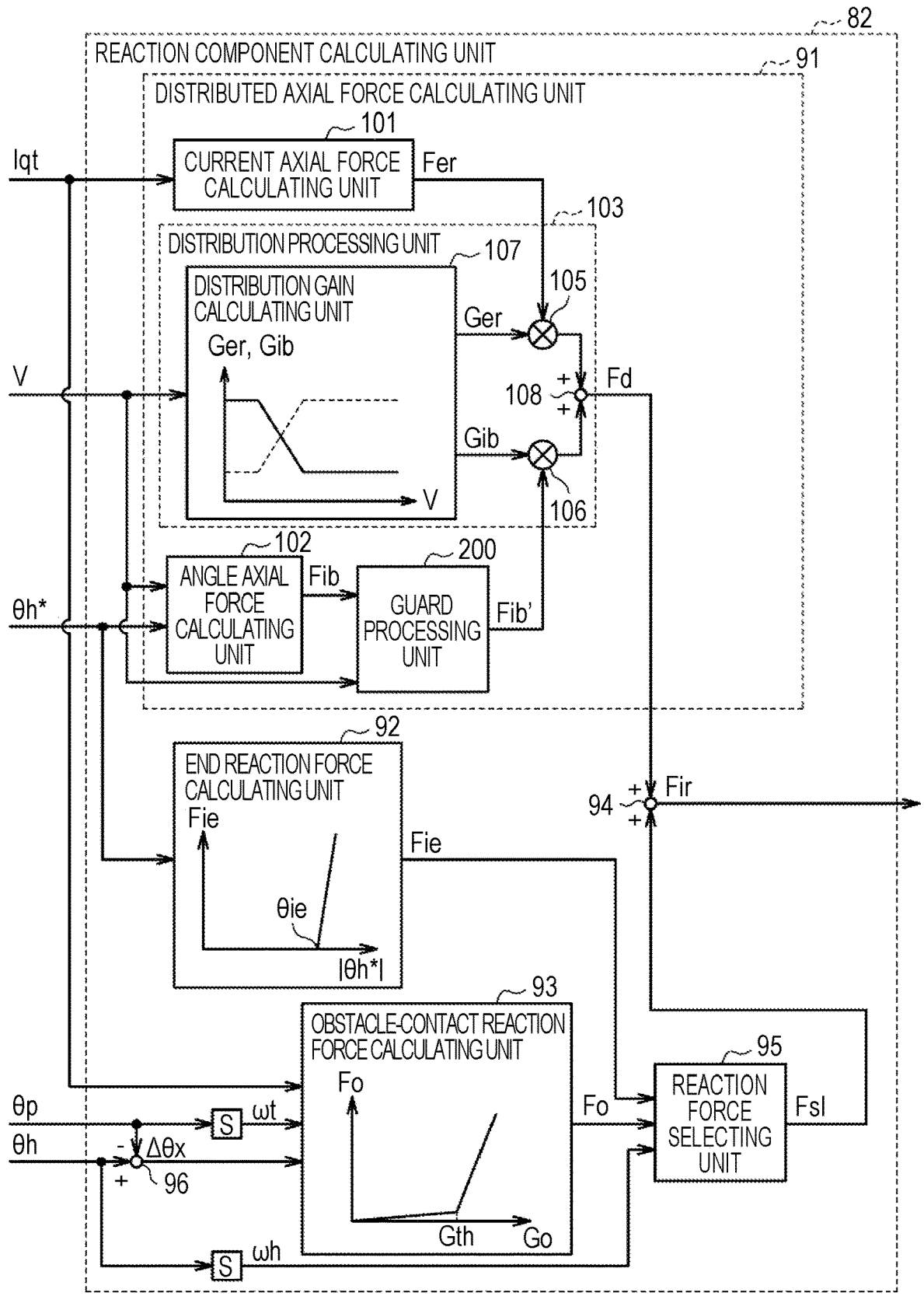
FIG. 4 is a block diagram illustrating a reaction component calculating unit.

As illustrated in FIG. 4, the reaction component calculating unit 82 includes a distributed axial force calculating unit 91, an end reaction force calculating unit 92, and an obstacle-contact reaction force calculating unit 93. The distributed axial force calculating unit 91 calculates a distributed axial force Fd as an axial component corresponding to an axial force acting on the rack shaft 22 that operates to turn the turning wheels 5. The end reaction force calculating unit 92 calculates an end reaction force Fie which is a reaction force for restricting additional turning steering when the absolute value of the steering angle θh of the steering wheel 3 approaches a limit steering angle. The obstacle-contact reaction force calculating unit 93 calculates an obstacle-contact reaction force Fo which is a reaction force for restricting steering for turning the turning wheels 5 toward an obstacle such as a curbstone when the turning wheel 5 comes into contact with the obstacle by turning. The reaction component calculating unit 82 calculates a reaction component Fir by adding one of the end reaction force Fie and the obstacle-contact reaction force Fo, which has a larger absolute value, to the distributed axial force Fd. Then, the reaction component calculating unit 82 outputs the reaction component Fir.

Specifically, the distributed axial force calculating unit 91 includes a current axial force calculating unit 101 that calculates a current axial force Fer and an angle axial force calculating unit 102 that calculates an angle axial force Fib. The current axial force Fer and the angle axial force Fib are calculated in the same dimension (N·m) as a torque. The distributed axial force calculating unit 91 includes a distribution processing unit 103 that calculates a distributed axial force Fd corresponding to a computational axial force that is an estimated axial force acting on the rack shaft 22 which is obtained by distributing the angle axial force Fib and the current axial force Fer in predetermined proportions such that the axial force acting on the rack shaft 22 via the turning wheels 5 is appropriately reflected.

The q-axis current value Iqt for the turning-side motor 32 is input to the current axial force calculating unit 101. The current axial force calculating unit 101 calculates the current axial force Fer based on the q-axis current value Iqt. The current axial force Fer is an estimated value of an axial force which acts actually on the rack shaft 22 that operates to turn the turning wheels 5, that is, an axial force which is actually transmitted to the rack shaft 22. The current axial force Fer is calculated as an axial force in which road-surface information is reflected. Examples of the road-surface information include information regarding fine unevenness not affecting the behavior of the vehicle in the lateral direction and a stepped portion affecting the behavior of the vehicle in the lateral direction. Specifically, the current axial force calculating unit 101 calculates the current axial force Fer such that the absolute value thereof increases as the absolute value of the q-axis current value Iqt increases on the assumption that a torque applied to the rack shaft 22 by the turning-side motor 32 is balanced with a torque corresponding to a force applied to the rack shaft 22 via the turning wheels 5. The calculated current axial force Fer is output to the multiplier 105.

The target steering angle θh* which is a target turning-corresponding angle and the vehicle speed V are input to the angle axial force calculating unit 102. The angle axial force calculating unit 102 calculates the angle axial force Fib based on the target steering angle θh* and the vehicle speed V. The angle axial force Fib is an ideal value of an axial force defined by a model of the vehicle which is appropriately set. The angle axial force Fib is calculated as an axial force in which the road-surface information is not reflected. Specifically, the angle axial force calculating unit 102 calculates the angle axial force Fib such that the absolute value thereof increases as the absolute value of the target steering angle θh* increases. The angle axial force calculating unit 102 calculates the angle axial force Fib such that the absolute value thereof increases as the vehicle speed V increases. The calculated angle axial force Fib is output to a guard processing unit 200.

The angle axial force Fib and the vehicle speed V are input to the guard processing unit 200. The guard processing unit 200 includes an angle axial force adjustment map in which a relationship between the angle axial force Fib and the vehicle speed V and an adjusted angle axial force Fib' is defined, and calculates the adjusted angle axial force Fib' using the map and using the angle axial force Fib and the vehicle speed V as inputs. The angle axial force adjustment map is a map serving to perform a guard process such that the angle axial force Fib is not excessive (i.e., such that the angle axial force Fib is not excessively large).

Figure 5:
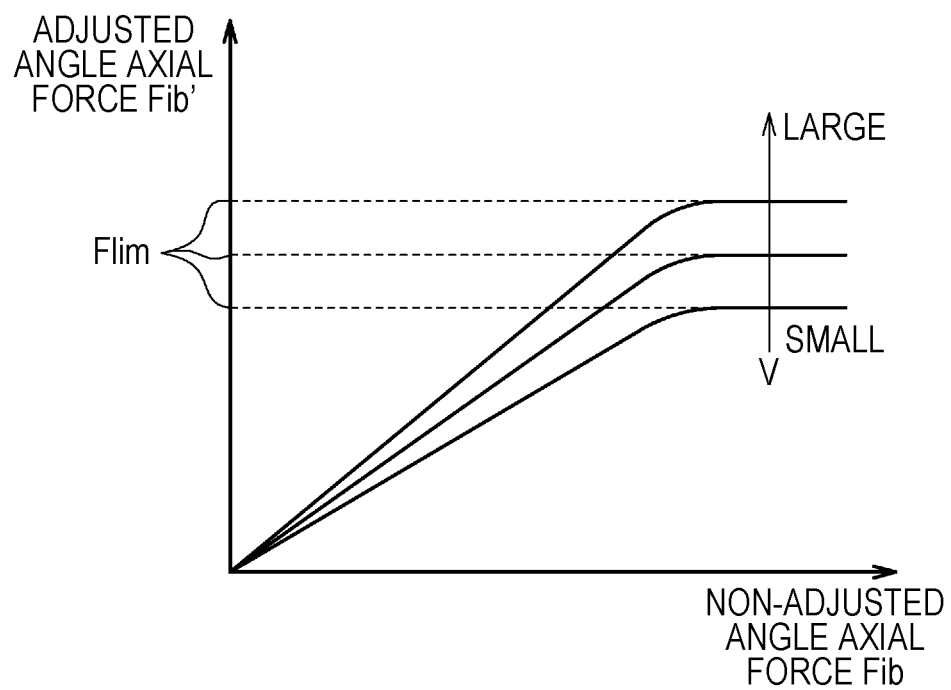
FIG. 5 is a graph illustrating an example of an angle axial force adjustment map.

As illustrated in FIG. 5, the angle axial force adjustment map is set such that the adjusted angle axial force Fib' increases linearly as the angle axial force Fib increases in a small area and a middle area when the absolute value of the angle axial force Fib is classified into three areas including a small area, a middle area, and a large area. The angle axial force adjustment map is set such that the absolute value of the adjusted angle axial force Fib' is limited to a predetermined limit value Flim in an area in which the absolute value of the angle axial force Fib is large. The limit value Flim is set to have a larger value as the vehicle speed V becomes higher. The limit value Flim is set, based by experiment, simulation, or the like, to a value in a range in which the reaction component Fir calculated based on the adjusted angle axial force Fib', that is, the target reaction force Ts* is not excessive. The guard processing unit 200 adjusts the angle axial force Fib corresponding to the vehicle speed V through map calculation using the angle axial force adjustment map. The calculated adjusted angle axial force Fib' is output to a multiplier 106.

The current axial force Fer and the adjusted angle axial force Fib' in addition to the vehicle speed V are input to the distribution processing unit 103. The distribution processing unit 103 includes a distribution gain calculating unit 107 that calculates distribution gains Ger and Gib which are distribution proportions for distributing the current axial force Fer and the angle axial force Fib' based on the vehicle speed V.

The distribution gain calculating unit 107 according to this embodiment includes a distribution gain map in which a relationship between the vehicle speed V and the distribution gains Ger and Gib is defined, and calculates the distribution gains Ger and Gib using the map and using the vehicle speed V as an input. The distribution gain Gib has a value which is smaller when the vehicle speed V is high than when the vehicle speed V is low, and the distribution gain Ger has a value which is larger when the vehicle speed V is high than when the vehicle speed is low. That is, the distribution proportion of the angle axial force Fib in the distributed axial force Fd decreases as the vehicle speed V increases, and the distribution proportion of the current axial force Fer in the distributed axial force Fd increases as the vehicle speed V increases.

Particularly, the distribution gain Ger is zero when the vehicle speed V is a low speed including stopping. In this case, the current axial force Fer indicates that the distribution proportion thereof is zero, that is, the current axial force is not distributed to the distributed axial force Fd. The distribution gain Gib is zero when the vehicle speed V is a high speed which is sufficiently higher than the low speed. In this case, the angle axial force Fib indicates that the distribution proportion thereof is zero, that is, the angle axial force is not distributed to the distributed axial force Fd. That is, the distribution proportion in this embodiment includes a concept of a zero value in which only one of the current axial force Fer and the angle axial force Fib is distributed to the distributed axial force Fd. The distribution gains Ger and the Gib are calculated such that the sum thereof is "1." The calculated distribution gain Ger is output to a multiplier 105 and the calculated distribution gain Gib is output to a multiplier 106.

The distribution processing unit 103 calculates the distributed axial force Fd by causing an adder 108 to sum a value acquired by causing the multiplier 105 to multiply the current axial force Fer by the distribution gain Ger and a value acquired by causing the multiplier 106 to multiply the angle axial force Fib by the distribution gain Gib. The calculated distributed axial force Fd is output to the adder 94.

The target steering angle $\theta h^*$ which is a target turning-corresponding angle is input to the end reaction force calculating unit 92. The end reaction force calculating unit 92 includes an end reaction force map in which a relationship between the target steering angle $\theta h^*$ and the end reaction force Fie is defined, and calculates the end reaction force Fie using the map and using the target steering angle $\theta h^*$ as an input. The end reaction force map is set such that a zero value is calculated as the end reaction force Fie when the absolute value of the target steering angle $\theta h^*$ is equal to or less than a threshold angle $\theta ie$, and a value of which the absolute value is larger than the zero value is calculated as the end reaction force Fie when the target steering angle $\theta h^*$ is greater than the threshold angle $\theta ie$.

The end reaction force Fie is set such that the absolute value thereof is so large that turning steering cannot be performed any more with a human force when the target steering angle $\theta h^*$ increases to be sufficiently greater than the threshold angle $\theta ie$. The end reaction force Fie is a high-gradient axial force of which the value increases suddenly in proportion to the target steering angle $\theta h^*$ when the target steering angle $\theta h^*$ increases to be sufficiently greater than the threshold angle $\theta ie$. The threshold angle $\theta ie$ is set to the value of the turning-corresponding angle $\theta p$ at a virtual rack end position which is provided closer to the neutral position than a mechanical rack end position at which a rack end 25 comes into contact with the rack housing 23 and movement of the rack shaft 22 in the axial direction is restricted. The calculated end reaction force Fie is output to a reaction force selecting unit 95.

In addition to the q-axis current value Iqt, an angle difference $40x$ which is acquired from a subtractor 96 by subtracting the turning-corresponding angle $\theta p$ from the steering angle $\theta h$, and a turning speed cot which is acquired by differentiating the turning-corresponding angle $\theta p$ are input to the obstacle-contact reaction force calculating unit 93. The obstacle-contact reaction force calculating unit 93 according to this embodiment calculates an obstacle-contact gain Go indicating a degree of approximation to a situation in which the obstacle-contact reaction force Fo is to be applied, based on the state quantities. The obstacle-contact reaction force calculating unit 93 includes an obstacle-contact reaction force map in which a relationship between the obstacle-contact gain Go and the obstacle-contact reaction force Fo is defined, and calculates the obstacle-contact reaction force Fo using the map and using the obstacle-contact gain Go as an input.

The obstacle-contact reaction force map is set such that the obstacle-contact reaction force Fo is zero when the obstacle-contact gain Go is zero and the obstacle-contact reaction force Fo increases gradually in proportion to the obstacle-contact gain Go. When the obstacle-contact gain Go is greater than a gain threshold value Gth, the obstacle-contact reaction force Fo increases suddenly in proportion to the obstacle-contact gain Go. The gain threshold value Gth is a value in a range in which it can be determined that the turning wheel 5 is in contact with an obstacle by turning, and the gain threshold value Gth is set based on experiment, simulation, or the like. The obstacle-contact reaction force Fo is set such that the absolute value thereof is so large that turning steering cannot be performed any more with a human force when the obstacle-contact gain Go is sufficiently greater than the gain threshold value Gth. The obstacle-contact reaction force Fo is a high-gradient axial force of which the value increases suddenly in proportion to the obstacle-contact gain Go when the obstacle-contact gain Go is greater than the gain threshold value Gth. Accordingly, in an area in which the obstacle-contact gain Go is equal to or less than the gain threshold value Gth, a reaction when only a tire part of the turning wheel 5 comes into contact with an obstacle is reproduced by the obstacle-contact reaction force Fo. This reaction force depends on characteristics based on an elastic component of rubber of the turning wheels 5 and characteristics based on an elastic component of a suspension of the vehicle connected to the turning wheels 5 and can be calculated by experiment. In an area in which the obstacle-contact gain Go is greater than the gain threshold value Gth, a reaction force when a wheel part of the turning wheel 5 comes into contact with an obstacle is reproduced by the obstacle-contact reaction force Fo. The calculated obstacle-contact reaction force Fo is output to the reaction force selecting unit 95.

In addition to the end reaction force Fie and the obstacle-contact reaction force Fo, a steering speed $\omega h$ which is acquired by differentiating the steering angle $\theta h$ is input to the reaction force selecting unit 95. The reaction force selecting unit 95 selects one reaction force of the end reaction force Fie and the obstacle-contact reaction force Fo, which has a larger absolute value. Then, the reaction force selecting unit 95 outputs a selected reaction force Fsl to the adder 94. The selected reaction force Fsl is a value acquired by setting a sign of the above-mentioned selected one reaction force, that is, a direction of the above-mentioned selected one reaction force to a sign indicated by the steering speed ωh.

Then, the reaction component calculating unit 82 outputs a reaction component Fir to the target steering angle calculating unit 83. The reaction component Fir is a value obtained by causing the adder 94 to add the selected reaction force Fsl to the distributed axial force Fd. Operations of this embodiment will be described below.

When a vehicle is traveling, the vehicle may be in a situation in which a centrifugal force is greater than a frictional force between rear wheels and a road surface while the vehicle is being turned by a driver's steering of the steering wheel 3. This situation is likely to occur particularly on a low-friction road such as a frozen road. In this case, the vehicle is in an oversteering state in which the vehicle is turned more than the driver's steering of the steering wheel 3. In this oversteering state, the driver performs so-called counter-steering for steering the steering wheel 3 to a side opposite to the side to which the vehicle is turning such that a posture of the vehicle is restored. Here, the angle axial force Fib is based on the target turning angle θh* which is acquired based on the steering angle θh of the steering wheel 3. Accordingly, when the steering angle θh of the steering wheel 3 becomes a large angle close to an end contact by performing the counter-steering, the angle axial force Fib is excessive and the reaction component Fir which is calculated in consideration of the angle axial force Fib increases. When the target reaction torque Ts* is calculated based on the reaction component Fir, the steering reaction force applied to the steering wheel 3 may become excessive.

In this regard, in this embodiment, the guard process is performed by the guard processing unit 200 such that the angle axial force Fib is not excessive (i.e., such that the angle axial force Fib is not excessively large). That is, the adjusted angle axial force Fib' subjected to the guard process by the guard processing unit 200 instead of the angle axial force Fib acquired by the angle axial force calculating unit 102 is reflected in the reaction component Fir. Accordingly, even in a situation in which counter-steering is performed, the reaction component Fir and the target reaction torque Ts* calculated based on the reaction component Fir are less likely to be excessive. Accordingly, it is possible to curb an excessive increase of the steering reaction force applied to the steering wheel 3.

Advantages of this embodiment will be described below. (1) Since the guard process is performed by the guard processing unit 200 such that the angle axial force Fib is not excessive, a driver is less likely to feel heaviness during steering of the steering wheel 3 and it is possible to prevent a feeling of steering from becoming worse in a situation in which counter-steering is being performed.

(2) Since the guard processing unit 200 can set the limit value Flim for the guard process, the angle axial force Fib can be appropriately limited to a desired limit value. (3) In this embodiment, since adjustment can be performed using the angle axial force adjustment map such that the angle axial force Fib is not excessive, it is possible to simplify a configuration associated with the guard process.

(4) In this embodiment, since the angle axial force Fib is adjusted using the angle axial force adjustment map, an optimal steering reaction force based on specifications of a vehicle can be easily realized by changing the shape of the map.

(5) For example, when the vehicle is traveling at a high speed, an axial force acting on the rack shaft 22 increases and thus the angle axial force Fib may be set to increase in consideration of a road-surface reaction force. The same applies to a situation in which counter-steering is being performed. In this regard, in this embodiment, since the limit value Flim is adjusted based on the vehicle speed V, it is possible to apply an appropriate steering reaction force while restraining the steering reaction force from being excessive in a situation in which counter-steering is being performed.

This embodiment may be modified as follows. The embodiment and the following modified examples can be combined unless technical confliction arises. The guard processing unit 200 may have a function of selecting a value to be output by comparison between the absolute value of the angle axial force Fib and the limit value Flim instead of a map calculation function using the angle axial force adjustment map. In this case, the guard processing unit 200 is in a selection state in which the angle axial force Fib acquired by the angle axial force calculating unit 102 is output when the absolute value of the angle axial force Fib is equal to or less than the limit value Flim. On the other hand, the guard processing unit 200 is in a selection state in which the angle axial force Fib set to the limit value Flim is output when the absolute value of the angle axial force Fib is greater than the limit value Flim. The guard processing unit 200 may have a function of making the absolute value of the angle axial force Fib equal to or less than the limit value Flim by offsetting the angle axial force Fib by a predetermined offset value to decrease the absolute value of the angle axial force Fib. In this case, the guard processing unit 200 is in a state in which the angle axial force Fib acquired by the angle axial force calculating unit 102 is output when the absolute value of the angle axial force Fib is equal to or less than the limit value Flim. On the other hand, the guard processing unit 200 is in a state in which the angle axial force Fib offset by the predetermined offset value is output when the absolute value of the angle axial force Fib is greater than the limit value Flim.

The limit value Flim may not be changed according to the vehicle speed V. The limit value Flim may be changed, for example, according to another parameter such as a lateral acceleration or a yaw rate. In this case, the vehicle speed V may be added to the parameter.

In control of the steering-side motor 13, the target reaction torque Ts* may be calculated using, as the input torque base component Tb*, a value acquired by performing torque feedback control for causing the steering torque Th to follow the target steering torque calculated based on the steering torque Th and the reaction component Fir. In addition, in control of the steering-side motor 13, so-called feedforward control may be performed instead of performing the steering angle F/B control. In this case, the target reaction torque Ts* may be calculated based on an assist component which is calculated based on the steering torque Th and the reaction component Fir.

The distribution processing unit 103 may change the distribution proportions of the current axial force Fer and the angle axial force Fib according to a parameter other than the vehicle speed V. For example, a drive mode indicating a state in which a control pattern of an onboard engine or the like is set can be used as such a parameter.

The obstacle-contact reaction force calculating unit 93 may determine whether the obstacle-contact reaction force Fo is to be applied, for example, based on a result of comparison between the q-axis current value Iqt, the angle difference Δθx, and the turning speed ωt and the threshold values corresponding thereto.

The angle axial force calculating unit 102 may calculate the angle axial force Fib based on the steering angle θh or the turning-corresponding angle θp or may calculate the angle axial force Fib using another method of considering another parameter such as the steering torque Th or the vehicle speed V.

In addition to the current axial force Fer and the angle axial force Fib, an axial force based on another parameter may be distributed to the distributed axial force Fd. For example, a vehicle state quantity axial force which is calculated based on a yaw rate and a lateral acceleration, an axial force based on a detection value from an axial force sensor that detects the axial force of the rack shaft 22, or an axial force based on a tire force acting on the turning wheels 5 can be employed as the axial force based on the other parameter.

The reaction component calculating unit 82 may reflect at least the angle axial force Fib in the reaction component Fir. When the reaction component calculating unit 82 reflects only the angle axial force Fib in the reaction component Fir, the current axial force calculating unit 101 and the distribution processing unit 103 can be omitted.

The reaction component calculating unit 82 may calculate one of the end reaction force Fie and the obstacle-contact reaction force Fo as the reaction component for restricting steering. The reaction component calculating unit 82 may set the reaction component for restricting steering to a reaction force that occurs under a situation or a condition different from the situations or the conditions under which the end reaction force Fie and the obstacle-contact reaction force Fo occur, instead of or in addition to the end reaction force Fie and the obstacle-contact reaction force Fo. For example, a reaction force which is applied when a voltage of an onboard power source B decreases and a sufficient turning force cannot be applied by the turning-side motor 32 may be employed, as the reaction force that occurs under a situation or a condition different from the situations or the conditions under which the end reaction force Fie and the obstacle-contact reaction force Fo occur.

In Expression (1) described above, the target steering angle θh* may be calculated using a model expression which is modeled additionally using a so-called spring constant such as a spring coefficient K which is determined based on specifications of the suspension or wheel alignment of the vehicle.

In the aforementioned embodiment, as the steering system 2 which is controlled, a steering system with a structure in which a power transmission path between the steering unit 4 and the turning unit 6 can be cut off by a clutch may be controlled. In the aforementioned embodiment, the steering control device 1 can be constituted by a processing circuit including 1) one or more processors that operate in accordance with a computer program (software), 2) one or more dedicated hardware circuits such as an application-specific integrated circuit (ASIC) that performs at least some of various processes, or 3) a combination thereof. The processor includes a CPU and a memory such as a RAM and a ROM. The memory stores program codes or instructions for causing the CPU to perform a process. The memory, that is, a non-transitory computer-readable medium, includes all available media that can be accessed by general-purpose or dedicated computers.

What is claimed is:

1. A steering control device configured to control a steer-by-wire steering system in which a power transmission path is cut off between a steering unit and a turning unit that turns turning wheels of a vehicle according to steering input to the steering unit by an operator of the vehicle via a steering wheel, the steering control device comprising:
an electronic control unit configured (i) to calculate a target reaction torque that is a target value of a steering reaction force that is a force against the steering input to the steering unit and (ii) to control operation of a steering-side motor that is provided in the steering unit such that a motor torque corresponding to the target reaction torque is generated by the steering-side motor, wherein
the electronic control unit calculates a distributed axial force by:
calculating a current axial force, which is an axial force that is determined based on output of a turning side motor installed in the turning unit and in which road-surface information is reflected;
calculating an angle axial force, which is an axial force that is determined based on an angle that can be converted into a steering angle of the steering wheel and in which road-surface information is not reflected, the angle axial force being calculated based on a speed of the vehicle and a target steering angle;
performing guard processing on the angle axial force that has been calculated so that an absolute value of the angle axial force, after performing the guard processing, does not exceed an adjustable limit value, the guard processing being performed based on the speed of the vehicle and the angle axial force that has been calculated; and
calculating the distributed axial force obtained by distributing the angle axial force on which the guard processing has been performed and the current axial force that has been calculated in predetermined proportions.

2. The steering control device according to claim 1, wherein the electronic control unit includes a memory in which is stored an angle axial force adjustment map, and the electronic control unit performs the guard processing by using the angle axial force adjustment map to select the adjustable limit value.

3. The steering control device according to claim 1, wherein the adjustable limit value is adjusted based on the speed of the vehicle.

4. The steering control device according to claim 1, wherein the electronic control unit, in performing the guard processing, allows the angle axial force to increase linearly as the target steering angle increases, until the angle axial force reaches the adjustable limit value at which the angle axial force is maintained at the adjustable limit value as the target steering angle continues to increase.

* * * * *